Aug. 29, 1967 N. C. PACE 3,339,140
SOLID-STATE TWO-WAY RADIO SWITCHING SYSTEM APPLICATION
Filed Aug. 4, 1964
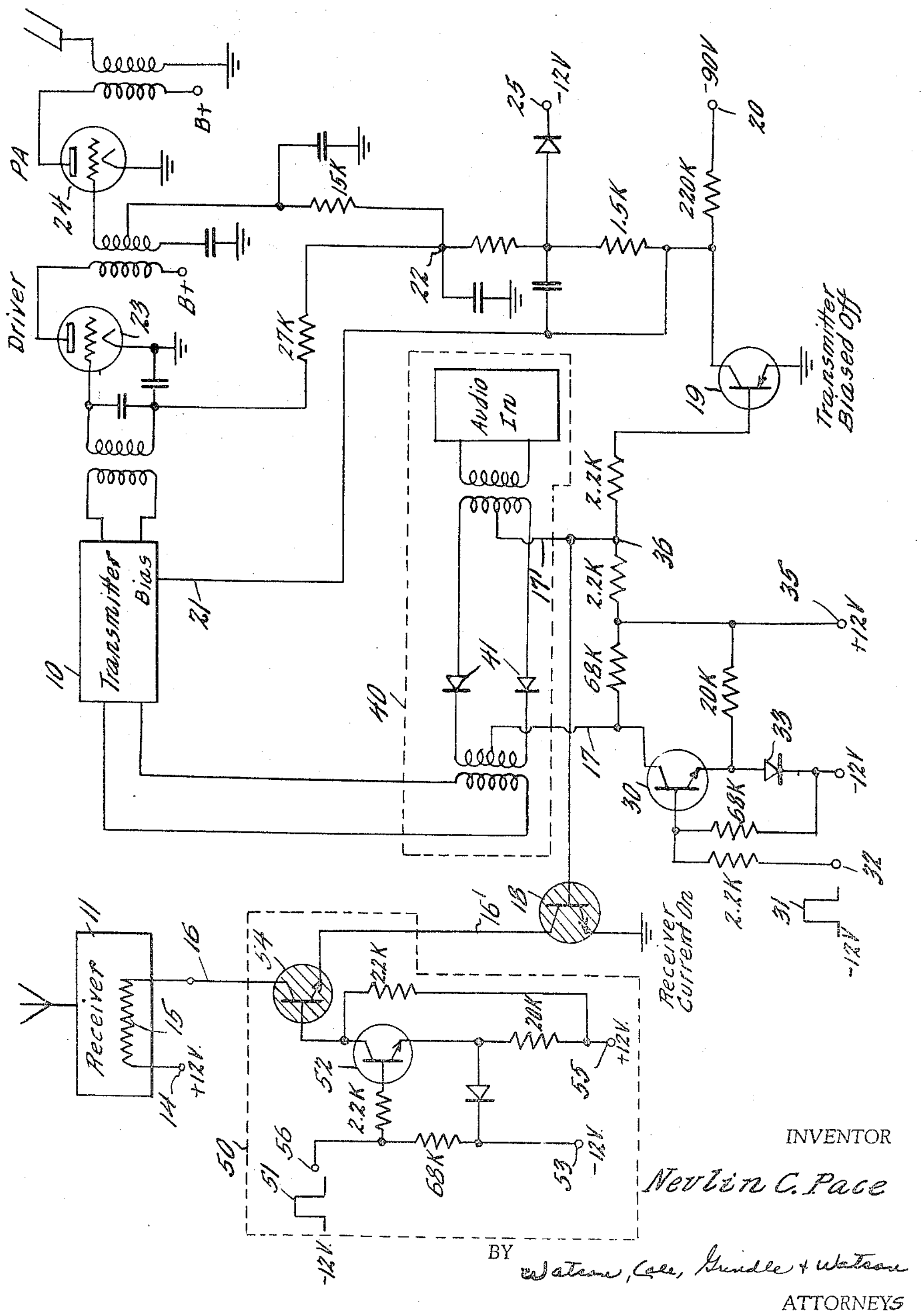
INVENTOR
Nevlin C. Pace
BY Watson, Cole, Grindle & Watson
ATTORNEYS United States Patent Office 3,339,140

Patented Aug. 29, 1967

3,339,140

SOLID-STATE TWO-WAY RADIO SWITCHING SYSTEM APPLICATION

Nevlin C. Pace, 4306 N. 40th St., Arlington, Va. 22207

Filed Aug. 4, 1964, Ser. No. 387,322
4 Claims. (Cl. 325—21)

This invention relates to radio communication systems and more particularly it relates to switching circuits for enabling either a transmitter or a receiver to be connected into a communication channel.

In two-way communication systems, the mode of transmission called simplex provides for only a transmitter or receiver alone operative at either end on a common frequency. Thus, a switching circuit is required for changing from transmit to receive. In conventional systems an electromechanical relay is used to connect power alternately to the transmitter and receiver. However, this has several disadvantages including the possible unreliability of contact closures particularly where breaking transmitter power.

When the transmission channel is used for code transmission, and control signals are introduced for automatic changeover of direction of transmission, the time it takes for operation of relay circuits may become undesirable. Particularly in the case of communication systems such as used for automatic control of locomotives, it is imperative to transfer conditions very quickly in response to predetermined code arrangements.

Therefore it is an object of the invention to produce a high speed switching control circuit for simplex communication systems which is operable at electronic speeds.

A further object of the invention is to produce a reliable switching control system for alternately switching into operation a transmitter and a receiver at a single station.

Thus in accordance with the invention, a solid-state switching circuit is provided to alternately switch off the transmitter circuits while connecting operating power to the receiver, and vice versa. Since receiver power is low compared to transmitter power, the transmitter is controlled by switching bias potentials, whereas the receiver power is controlled by a current switching the power line. Each of these functions is performed by a transistor circuit, and a common switching transistor is so connected that only one of the functional transistors is operable at a time.

Other features and objectives of the invention are described with reference to the accompanying drawing which shows in its single figure:

A schematic circuit diagram of a switching control system for a communication channel.

The communication channel has at either end a transmitter 10, and receiver 11, each tuned to a predetermined channel frequency. The receiver may be a transistorized mobile type device operable from a +12 volt source at terminal 14 to draw power represented by the typical load of resistor 15. Both the receiver 11 and transmitter 12 have their own antenna so that R-F switching is not a requisite.

Circuits in the dotted blocks are optional and for discussion of the switching system, the respective leads 16 and 17 may be considered connected together. Thus, it may be seen that the conducting NPN transistor 18 passes current from the +12 volt power source to the receiver for normal operation in the condition shown in the drawing.

In this same condition the PNP transistor 19 is nonconductive, to establish the —90 volt bias at terminal 20 at both the bias terminal 21 in the transmitter block and at terminal 22 to bias off the driver stage 23 and power amplifier stage 24. When transistor 19 is turned on, the —12 volt protective bias level at terminal 25 operates to put the transmitter power stages in transmit condition, while terminal 21 is effectively grounded through the emitter-collector path of transistor 19.

Transistor switching circuit 30 serves to maintain only one of transistors 18 and 19 in conductive condition depending upon the level of potential 31 at input terminal 32. As shown, transistor 30 is non-conductive as a result of the —12 volt bias through diode 33 to its emitter. However, when the base circuit is grounded by a waveform or switch at terminal 32, it conducts.

The NPN receiver power transistor 18 is held conductive by the +12 volt potential at terminal 35 connected to its base circuit via lead 17', while the same potential source biases off the PNP transmitter switching transistor 19. In essence the ground potential of waveform 31 establishes point 36 at —12 volts by turning on transistor 30, to thus reverse the conductive states of NPN transistor 18 and PNP transistor 19. Thus, the transmit-receive instruction may be given at electronic speeds by a waveform at terminal 32.

A current responsive audio gating circuit is provided within dotted block 40 to remove modulation from the transmitter as well, if desired. Thus, gating diodes 41 serve to decouple audio signals unless current flows therethrough responsive to conduction through leads 17–17' from transistor 30, which thereby also serves to connect in an audio modulation source when the transmitter is energized.

At times it is desirable to provide for decoupling receiver 11 by automatic control signals, such as used to switch in another stand-by unit upon failure to complete communication through the channel. The circuit in dotted block 50 accomplishes this at electronic speeds as directed by a change of input potential at waveform 51. Input NPN transistor 52 is held nonconductive by the —12 volts at terminal 53, whereas the auxiliary-receiver switching NPN transistor 54 is held conductive by the +12 volt potential at terminal 55. By grounding lead 56, the conduction of both transistors 52, 54 is changed to decouple receiver 11 from its power by preventing current flow through transistor 54.

It is seen therefore that provision of solid-state switching circuits provide for electronic switching speeds in changing from transmitter to receiver operation. This is done in accordance with the invention by reliable circuits which do not require long time constants taken when interrupting transmitter B+ for example. Thus, when used in code communication systems, the channel may be converted for immediate response to or transmission of code signals without possibility of losing signals or introducing false signals because of relay closures, power surges in the transmitter, etc. Accordingly, an improved switching control circuit is provided as defined with particularity in the appended claims.

What is claimed is:

1. A high speed switching control circuit for a communication channel to alternately switch in independently either a transmitter with an antenna or a receiver with a separate antenna comprising in combination, bias control circuit means in said transmitter for controlling transmission output to said antenna in response to a change of bias potential, a bias potential source providing two levels of operation for said bias control circuit means to respectively place the transmitter in transmission and cut-off modes, a solid-state switching circuit responsive to an input potential change to change said bias potential from one level to the other, a power source connected for passing energization current to said receiver for therewith processing signals received on its said separate antenna, and power control means controlled by said solid-state switching circuit for connecting said current to said receiver when said transmitter is cut off and disconnecting said current from said receiver when said transmitter is in the transmission mode.

2. The control circuit defined in claim 1, including an audio source, a current responsive audio input gating circuit coupled between said source and said transmitter to pass audio signals only in the presence of current flow therein, and means in said solid state switching circuit for passing current to said gating circuit to thereby couple audio signals to the transmitter only when said transmitter is in the transmission mode.

3. The control circuit defined in claim 1 including standby control means including a transistor current flow path connected in series with said power current flow source for said receiver and means responsive to input potential changes for selectively controlling conductivity of this transistor current flow path thereby decoupling the power current flow from said receiver independently from said power control means.

4. An electronic switching control circuit for a radio communication system comprising in combination a transmitter with a power amplifier stage coupled to an antenna and having a bias control circuit for establishing transmit and standby modes of operation by selecting the level of bias potential, a bias potential source, a circuit including a resistor and a transistor emitter-collector circuit coupling said bias source to said transmitter to establish two levels of bias dependent upon the conduction state of said transistor, a receiver with an antenna separate from the transmitter antenna, a power source for said receiver, a transistor circuit having its emitter-collector circuit coupled to pass current from said power source for the receiver to said receiver, and a switching circuit common to both the transmitter and receiver responsive to different potential levels for alternately switching only one of the two transistors into conduction, whereby either the transmitter or receiver is made operative in said communication system.

References Cited

UNITED STATES PATENTS

| | | | |
|---|---|---|---|
| 2,521,860 | 9/1950 | Marlowe | 325—22 |
| 2,912,574 | 11/1959 | Gensel | 325—319 X |
| 3,059,184 | 10/1962 | Germain | 343—180 X |
| 3,071,647 | 1/1963 | Grant | 179—170 X |
| 3,169,221 | 2/1965 | Franchi | 325—152 X |

JOHN W. CALDWELL, *Acting Primary Examiner.*

B. V. SAFOUREK, *Assistant Examiner.*